(12) United States Patent
Mizutani

(10) Patent No.: US 9,308,729 B2
(45) Date of Patent: Apr. 12, 2016

(54) INK JET RECORDING APPARATUS

(71) Applicant: Seiko Epson Corporation, Tokyo (JP)

(72) Inventor: Akira Mizutani, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/681,503

(22) Filed: Apr. 8, 2015

(65) Prior Publication Data

US 2015/0290941 A1 Oct. 15, 2015

(30) Foreign Application Priority Data

Apr. 9, 2014 (JP) ................. 2014-080523

(51) Int. Cl.
*B41J 2/165* (2006.01)
*C09D 11/00* (2014.01)
*C09D 11/30* (2014.01)
*C09D 11/322* (2014.01)
*C09D 11/38* (2014.01)

(52) U.S. Cl.
CPC .......... *B41J 2/16535* (2013.01); *B41J 2/16552* (2013.01); *C09D 11/00* (2013.01); *B41J 2/16505* (2013.01); *B41J 2002/1655* (2013.01); *B41J 2002/16558* (2013.01); *C09D 11/30* (2013.01); *C09D 11/322* (2013.01); *C09D 11/38* (2013.01)

(58) Field of Classification Search
CPC ...... C09D 11/30; C09D 11/322; C09D 11/38; B41J 2/16505; B41J 2/16552
See application file for complete search history.

(56) References Cited

U.S. PATENT DOCUMENTS

| | | | | |
|---|---|---|---|---|
| 5,814,685 | A | * | 9/1998 | Satake et al. ................ 523/201 |
| 2005/0093939 | A1 | * | 5/2005 | Takagi ............................ 347/84 |
| 2013/0300799 | A1 | | 11/2013 | Mizutani et al. |

FOREIGN PATENT DOCUMENTS

| | | | |
|---|---|---|---|
| JP | 2012251049 A | * | 12/2012 |
| JP | 2013-256102 A | | 12/2013 |

* cited by examiner

*Primary Examiner* — Lisa M Solomon
(74) *Attorney, Agent, or Firm* — Harness, Dickey & Pierce, P.L.C.

(57) ABSTRACT

An ink jet recording apparatus includes an ink composition including a pigment and a resin and not substantially including an alkyl polyol with a standard boiling point of 280° or higher; a recording head including a plurality of nozzles that discharge the ink composition, and a nozzle forming surface having the discharge ports of the plurality of nozzles; an absorption member that absorbs the ink attached to the discharge ports of the nozzles and the nozzle formation surface; and a driving mechanism that performs a cleaning operation by relatively moving at least one of the absorption member and the recording head, and removing the ink composition attached to the nozzle forming surface with the absorption member, where the resin is a core-shell resin provided with a core polymer and a shell polymer, and a glass-transition temperature of the shell polymer is higher than a glass-transition temperature of the core polymer.

8 Claims, 4 Drawing Sheets

INK JET RECORDING APPARATUS

BACKGROUND

1. Technical Field

The present invention relates to ink jet recording apparatus.

2. Related Art

In the related art, printing methods that use an ink jet recording method are performed by small droplets of ink being caused to fly and be attached on a recording medium, such as a paper. Through innovative progress in ink jet recording method techniques in recent years, so far, ink jet recording apparatuses using ink jet recording methods are utilized, even in the field of high definition image recording (image printing) using photographs or offset printing.

In the ink jet recording apparatus, the water content and the other volatile components included in the discharged ink are evaporated, and the viscosity of the ink rises (thickens). The thickened ink causes clogging in the nozzles, and ink ejection defects occur. In particular, since ink for printing on a recording medium such as plastic is prepared so that the drying speed becomes faster, clogging of the nozzles easily arises due to hardening of the ink.

In order to prevent or resolve discharge defects due to thickening of the ink as described above, an ink jet recording apparatus provided with a wiper mechanism (recovery mechanism) has been proposed (refer to JP-A-2013-256102). JP-A-2013-256102 discloses a technique of wiping ink attached to the nozzle surface using a fabric wiper. A maintenance liquid in included in the fabric wiper in order to make wiping the ink easier.

However, there is potential for a problem to arise of ink prepared in order to print on a recording medium formed from plastic or the like not being easily wiped even using a fabric wiper in which a maintenance liquid is included. This is because such an ink includes a resin for ink to be attached to plastic or the like, and when the resin fixes to the nozzle surface, the resin is not easily wiped even when the maintenance liquid is also used. When the pressing force of the fabric wiper is increased in order to peel the resin from the nozzle surface, there is potential to also peel off the liquid repellent film formed on the nozzle surface, and potential for adverse influence on subsequent discharging.

SUMMARY

An advantage of some aspects of the invention is to provide an ink jet recording apparatus with at least excellent wiping properties, cleaning properties and liquid repellent film storage properties, even in cases of performing recording using an ink composition.

As a result of thorough research in order to solve the above problems, the invention is as follows.

[1]

According to an aspect of the invention, there is provided an ink jet recording apparatus, including an ink composition including a pigment and a resin and not substantially including an alkyl polyol with a standard boiling point of 280° or higher; a recording head including a plurality of nozzles that discharge the ink composition, and a nozzle forming surface having the discharge ports of the plurality of nozzles; an absorption member that absorbs the ink composition attached to the discharge ports of the nozzles and the nozzle formation surface; and a driving mechanism that performs a cleaning operation by relatively moving at least one of the absorption member and the recording head, and removing the ink composition attached to the nozzle forming surface with the absorption member, in which the resin is a core-shell resin provided with a core polymer and a shell polymer, and a glass-transition temperature of the shell polymer is higher than a glass-transition temperature of the core polymer.

[2]

In the ink jet recording apparatus according to [1], it is preferable that the shell polymer includes an acrylate monomer and an aromatic monomer as constituent units.

[3]

In the ink jet recording apparatus according [1] or [2], it is preferable that the driving mechanism relatively presses the absorption member and the nozzle forming surface so that the linear pressure reaches 8 gf/cm to 150 gf/cm.

[4]

In the ink jet recording apparatus according to any one of [1] to [3], it is preferable that a liquid repellent film is formed on the nozzle forming surface.

[5]

It is preferable that the ink jet recording apparatus according to any one of [1] to [4], further includes a maintenance liquid used during the cleaning operation.

[6]

In the ink jet recording apparatus according to any one of [1] to [5], it is preferable that a surface tension at 25° C. of the maintenance liquid is 45 mN/m or less.

[7]

In the ink jet recording apparatus according to any one of [1] to [6], it is preferable that the glass transition temperature of the shell polymer is higher than the heating temperature of the recording medium when the ink composition is discharged.

[8]

In the ink jet recording apparatus according to any one of [1] to [7], it is preferable that the average particle diameter of the core-shell resin is 10 nm to 100 nm.

[9]

In the ink jet recording apparatus according to any one of [1] to [8], it is preferable that a difference between the glass transition temperatures of the core polymer and the shell polymer is 10° C. or higher.

BRIEF DESCRIPTION OF THE DRAWINGS

The invention will be described with reference to the accompanying drawings, wherein like numbers reference like elements.

DESCRIPTION OF EXEMPLARY EMBODIMENTS

Below, although forms (below, referred to as embodiments) for carrying out the invention are described in detail, the invention is not limited thereto, and various modifications are possible in a range not departing therefrom.

Ink Jet Recording Apparatus

Figure 1:
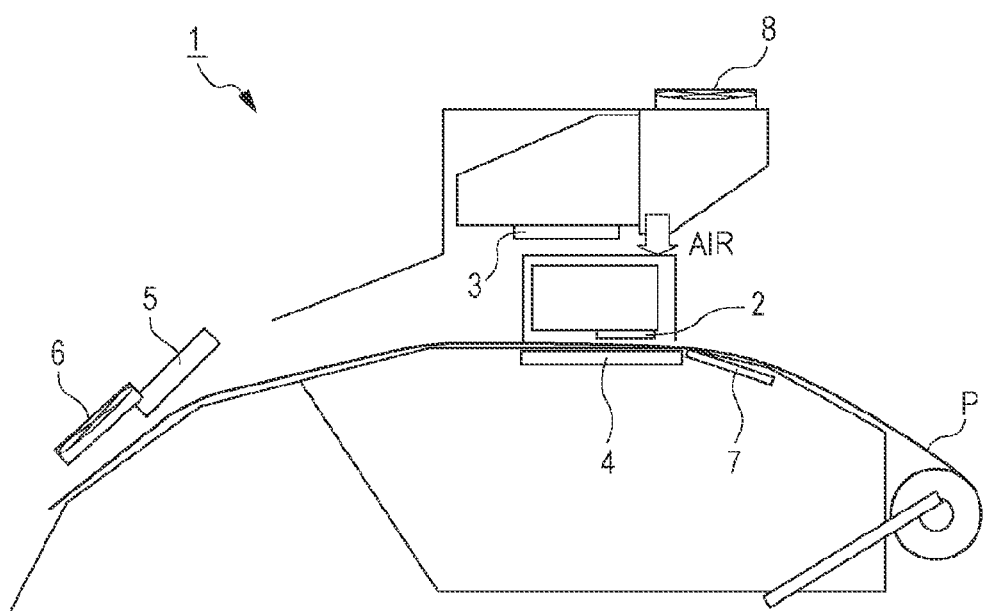
FIG. 1 is a schematic view showing an ink jet recording apparatus of the embodiment.

FIG. 1 is a schematic view showing an example of the ink jet recording apparatus according to the embodiment. As shown in FIG. 1, the ink jet recording apparatus 1 is provided with a recording head 2, an IR heater 3, a platen heater 4, a curing heater 5, a cooling fan 6, a pre-heater 7 and an air flow fan 8.

The pre-heater 7 heats the recording medium in advance, before the ink composition is discharged with respect to the recording medium P.

The recording head 2 discharges the ink composition with respect to the recording medium P. It is possible for a method known in the related art to be used as the recording head 2. Examples of the known methods include those that discharge liquid droplets using the vibration of a piezoelectric element, that is, heads that form ink droplets by mechanical deformation of an electrorestrictive element.

The IR heater 3 and the platen heater 4 heat the recording medium during discharge of the ink composition from the recording head 2. It is possible for the IR heater 3 to heat the recording medium from the recording head 2 side. In so doing, although the recording head 2 is also easily heated at the same time, it is possible for the temperature to be raised without adverse influence of the thickness of the recording medium, compared to a case of being heated from the rear surface of the recording medium such as by the platen heater 4. It is possible for the platen heater 4 to heat the recording medium from the opposite side to the recording head 2. In so doing, the recording head 2 is comparatively difficult to heat.

The IR heater 3 and the platen heater 4 perform heating so that the surface temperature of the recording medium becomes 30° C. or higher when the ink composition is discharged with respect to the recording medium. A temperature of 30° C. or higher to 60° C. or lower is more preferable. In so doing, the ink composition attached to the recording medium dries more quickly, and it is possible for bleeding to be much further suppressed.

The curing heater 5 heats and dries the recording medium to which the ink composition is attached. By the curing heater 5 heating the recording medium on which an image is recorded, the water content included in the ink composition is more quickly evaporated and dispersed and a coating film is formed by the core-shell resin included in the ink composition. In this way, the film derived from the ink composition is strongly fixed (attached) on the recording medium, and it is possible for a high quality image with excellent abrasion resistance to be obtained in a short time. It is preferable that the curing heater 5 heats the recording medium to a higher temperature than the IR heater 3 and the platen heater 4, and heating the recording medium to 60° C. or higher is preferable, to 70° C. or higher and 120° C. or lower is more preferable, and to 70° C. or higher to 110° C. or lower is still more preferable. The heating temperature of the recording medium is a temperature obtained by measuring the temperature of the surface of the recording medium.

By the cooling fan 6 cooling the ink composition on the recording medium after the ink composition is dried by the curing heater 5, it is possible for a coating film to be formed with good adhesiveness on the recording medium.

The air flow fan 8 more effectively dries the ink composition attached to the recording medium P.

Figure 2:
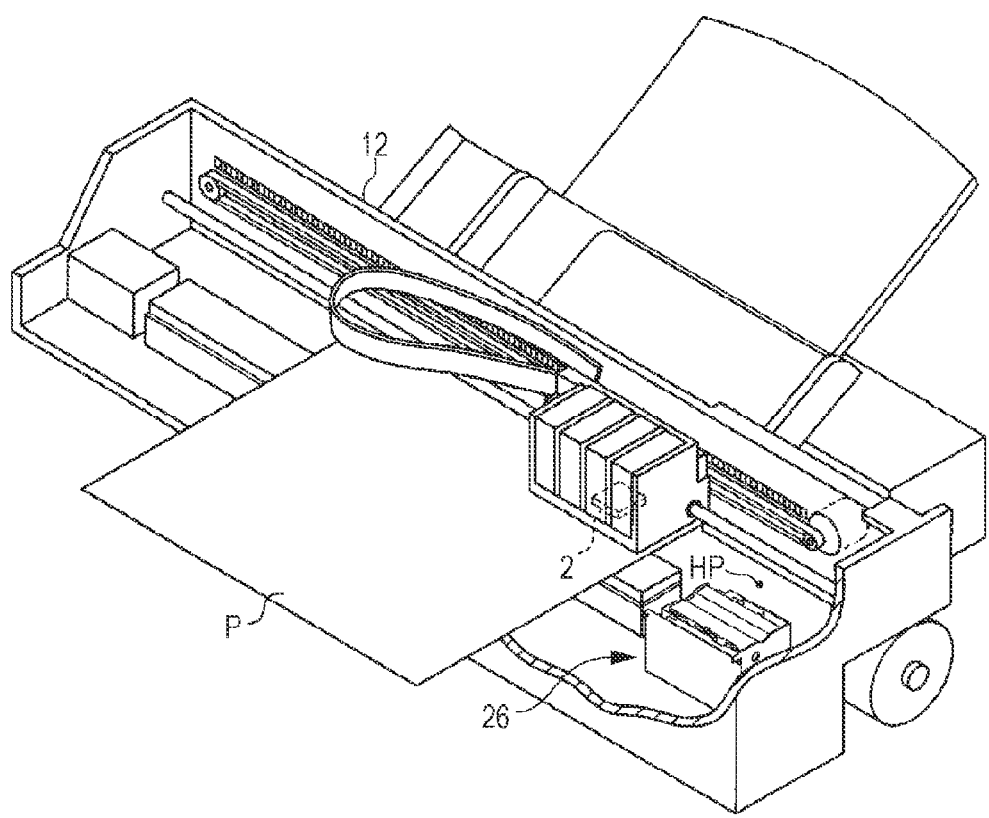
FIG. 2 is a perspective view showing the external appearance of a recording head and maintenance device of the ink jet recording apparatus.

FIG. 2 is a perspective view showing the external appearance of a recording head and maintenance device of the ink jet recording apparatus of the embodiment. In FIG. 2, configurations other than the recording portion shown in FIG. 1 are illustrated with the IR heater 3 and the heating unit removed.

As shown in FIG. 2, a maintenance device 26 for performing cleaning of the recording head 2 is provided at the home position HP provided on the right side of the recording region to which the recording medium P is transported in the frame 12.

Figure 3A:
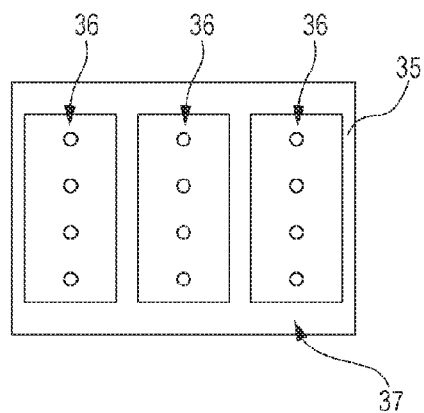
FIGS. 3A and 3B are drawings showing the nozzle forming surface of the recording head.
Figure 3B:
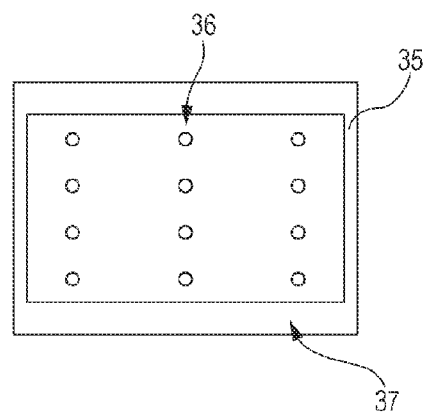

FIGS. 3A and 3B are schematic views showing the nozzle forming surface (nozzle plate) 37 of the recording head 2. The recording head 2 includes a nozzle forming surface 37 in which a plurality of nozzle rows 36 that discharge the ink composition are provided. In FIGS. 3A and 3B, the circles in the nozzle rows 36 correspond to the nozzles. The nozzle forming surface 37 is not particularly limited, as long as a plurality of nozzles that discharge the ink composition are provided therein.

A nozzle plate cover 35 is provided on the nozzle forming surface 37. Although not particularly limited, the arrangement pattern of the nozzle plate cover 35 on the nozzle forming surface 37 include, a pattern in which the nozzle plate cover 35 is provided so as to surround each nozzle row 36 (nozzle plate cover 35 is also provided between the nozzle rows 36) as shown in FIG. 3A, and a pattern in which the nozzle plate cover 35 is provided on the periphery of the region in which the nozzles are present so as to surround all of the nozzles (nozzle plate cover is not provided between the nozzle rows 36) as shown in FIG. 3B.

The nozzle plate cover 35 serves either a role of fixing the nozzle tips or a role of preventing the recording medium direct contacting the nozzles by the recording medium floating upward, in a nozzle forming surface of a head formed by a combination of a plurality of nozzle tips (below, simply referred to as "tip"). By covering at least a portion of the nozzle forming surface, the nozzle plate cover is provided in a state of protruding from the nozzles when viewed from the side surface.

Liquid Repellent Film

A liquid repellent film (not shown) is provided on the nozzle forming surface. The liquid repellent film is not limited to a film having liquid repellency, and, for example, it is possible to form a molecular film of metallic alkoxide having water repellency, and thereafter, perform a drying process and an annealing process. Although the metallic alkoxide molecular film may be any material having water repellency, a metallic alkoxide monomolecular film having a long chain polymer group (long chain RF group) including fluorine, and a monomolecular film of a metallic acid salt having a water repellent group (for example, a long chain polymer group including fluorine). Although the metallic alkoxide is not particularly limited, silicon, titanium, aluminum, and zirconium are generally used as the metals thereof. Examples of the long chain RF group include a perfluoroalkyl group, and a perfluoropolyethyl group. Examples of the alkoxysilane having the long chain RF group include a silane coupling agent having a long chain RF group. Although the liquid repellent film is not particularly limited, it is possible to use a silane coupling agent (SCA) film or those disclosed in Japanese Patent No. 4424954. In particular, those having water repellency are referred to as water repellent films.

Although a conductive film is formed on the nozzle plate and the liquid repellent film may be formed on the conductive film, a base film (plasma polymerization silicone (PPSi) film) is formed by first plasma polymerizing a silicon material, and the liquid repellent film may be formed on the base film. By interposing the base film, it is possible for the silicon material of the nozzle plate and the liquid repellent film to be thoroughly mixed.

It is preferable that the liquid repellent film has a thickness of 1 nm or more to 30 nm or less, having a thickness of 1 nm or more and 20 nm or less is more preferable, and having a thickness of 1 nm or more and 15 nm or less it still more preferable. By being in the above ranges, the liquid repellency of the nozzle forming surface tends to be superior, and the deterioration of the film is comparatively slow, and it is possible to maintain the liquid repellency over a longer time period. The film is superior also in terms of cost and ease of film formation.

Figure 4:
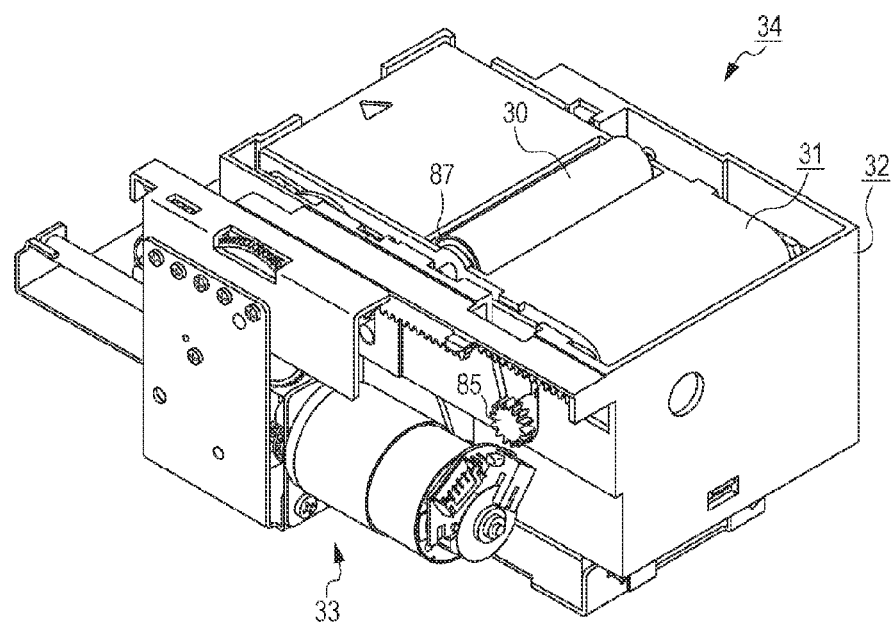
FIG. 4 is a perspective view of a wiper unit of the head maintenance device.
Figure 5A:
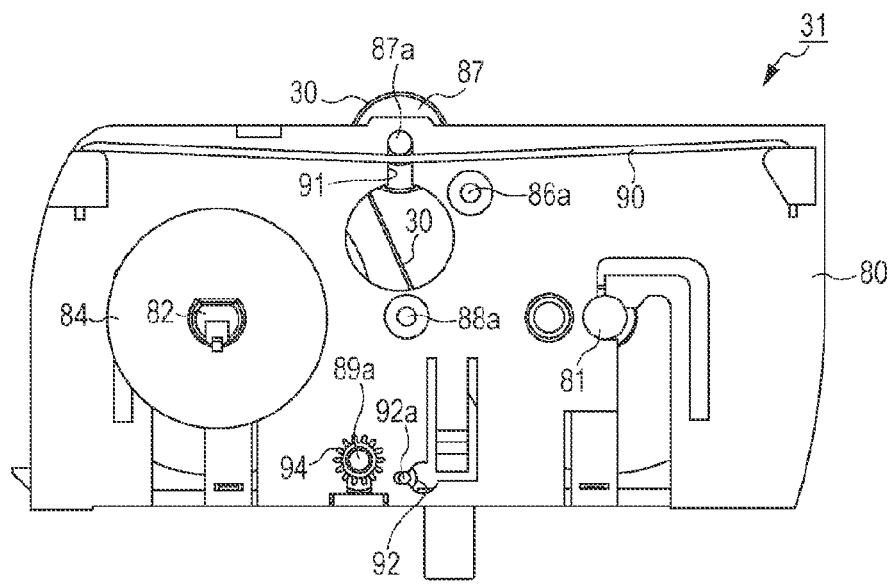
FIG. 5A is a front view of a wiper cassette of the head maintenance device.

The head maintenance device 26 is a device for wiping the ink composition attached to the discharge ports of the nozzles and the nozzle forming surface 37. FIG. 4 is a perspective view of a wiper unit of the head maintenance device 26. FIG. 5A is a front view of a wiper cassette of the head maintenance device 26, and FIG. 5B is a front view of a wiper cassette not depicting the housing.

The maintenance device 26 includes a wiper cassette 31 to which the absorption member 30 that wipes the ink from the nozzle forming surface 37 of the recording head 2 is mounted, a wiper holder 32 to which the wiper cassette 31 is mounted to be freely attached and detached, and a wiper unit 34 formed from a movement mechanism 33 by which the wiper holder 32 is moved in the nozzle row direction (transport direction of the recording medium in FIG. 2) of the recording head 2. The maintenance device 26 may be provided with a cap (not shown) provided able to abut on the nozzle forming surface 37 of the recording head 2 so as to surround the nozzles, and a suction pump (not shown) that suctions and discharges the ink thickened or the like from the recording head 2 as waste ink via the cap, in addition to the wiper unit 34.

Figure 5B:
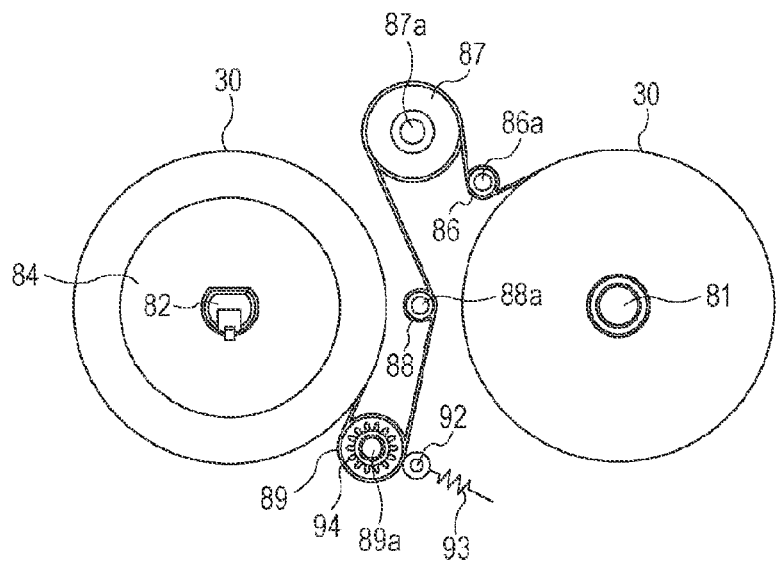
FIG. 5B is a front view of a wiper cassette not depicting the housing.

As shown in FIGS. 5A and 5B, on the inside of the housing 80 formed in a substantially rectangular box shape that configures the exterior case of the wiper cassette 31, a pair of rollers 81 and 82 having an axial line that extends horizontally in the front to rear direction that is the short axis direction of the housing 80 is accommodated at a distance in the left-to-right direction that is the longitudinal direction of the housing 80. The long absorption member 30 for wiping ink form the nozzle forming surface 37 of the recording head 2 is latched between the pair of rollers 81 and 82. From the pair of rollers 81 and 82, the delivery roller 81 as a first roller provided on the leftward side near the recording region in which the recording head 2 executes recording with respect to the recording medium P unreels the wound unused absorption member 30. Meanwhile, from the pair of rollers 81 and 82, the winding roller 82 as a second roller on the rightward side near opposite the recording region in which the recording head 2 executes recording with respect to the recording medium P winds up the used absorption member 30 used in wiping by being unwound from the delivery roller 81. The delivery roller 81 and the winding roller 82 are positioned as substantially the same height as one another. A delivery gear is provided to be able to rotate integrally with the delivery roller 81 on one end portion (front end portion) in the axial direction of the delivery roller 81 exposed to the outside of the housing 80. Winding gears 84 and 85 are provided to be able to rotate integrally with the winding roller 82 on both end portions in the axial direction of the winding roller 82 exposed to the outside of the housing 80.

A plurality (four in the embodiment) of rollers 86, 88, and 89 and a pressing member 87 are provided on the delivery path of the absorption member 30 from the delivery roller 81 to the winding roller 82 on the inside of the housing 80. These rollers 86, 88, and 89, and the pressing member 87 extend to the front and back in parallel in to the delivery roller 81 and the winding roller 82, and both ends in the front-to-back direction thereof are supported to freely rotate by a bearing or the like provided in the side wall portion of the housing 80.

Specifically, the part unreeled from the delivery roller 81 in the absorption member 30 is wound around the pressing member 87 provided obliquely upward to the right of the delivery roller 81. The shaft portions 87a on both sides in the axial direction in the pressing member 87 are supported from below by the rod spring 90 fixed to the outside surface on both sides to the front and rear of the housing 80. The rod spring 90 supports the shaft portion 87a of the pressing member 87 from below at an intermediate position in the length direction thereof. The shaft portions 87a of the pressing member 87 are inserted to the front and back with respect to bearing holes 91 provided in the housing 80, and adhered to the hole edge on the upper side of the bearing hole 91 according to the upward biasing force acting from the rod spring 90. The shaft portions 87a of the pressing member 87 are supported to freely rotate from above and below between the rod spring 90 and the hole edge of the bearing hole 91. The uppermost portion of peripheral surface in the pressing member 87 is positioned further upward that the upper surface of the housing 80, and a part wound around the pressing member 87 in the absorption member 30 protrudes upward from the upper surface of the housing 80. The uppermost portion of the peripheral surface in the pressing member 87 is positioned further upward that the nozzle forming surface of the recording head 2.

It is possible for the maintenance device 26 to apply a pressing load by pressing the absorption member 30 with respect to the nozzle forming surface 22 through the upward biasing force due to the rod spring 90. As long as it is able to press the absorption member to the nozzle forming surface with a given fixed load, the mechanism that applies the pressing load is not necessarily a spring, and rubber may be used, or the load applied with a method such as applying a load by electrically controlling a mechanical member without using these.

A relay roller 89 on which a part reeled out from the pressing member 87 in the absorption member 30 is wound around is provided vertically downward from the pressing member 87. A pinching roller 92 that pinches the absorption member 30 with the relay roller 89 is provided at a position that is the opposite side with respect to the relay roller 89 with the absorption member 30 interposed. The spring member 93 as a biasing member is interposed between the bottom wall inner surface of the housing 80 and the pinching roller 92. The pinching roller 92 is biased in a direction approaching the relay roller 89 by the spring member 93.

A relay gear 94 is provided to be able to rotate integrally with the relay roller 89 at the end portion of the shaft portion 89a on one side in the axial direction exposed to the outside from the side wall portion of the housing 80 in the relay roller 89. The end portions of the shaft portions 92a on both ends in the axial direction in the pinching roller 92 are exposed to the outside from a notched groove-shaped bearing portion formed when an elastic piece portion is notched in the side wall portion of the housing 80.

Tension rollers 86 and 88 that provided tension with respect to the absorption member 30 are provided between the delivery roller 81 and the pressing member 87 and between the pressing member 87 and the relay roller 89 on the delivery path of the absorption member 30 from the delivery roller 81 to the winding roller 82. The end portions of the shaft portions 86a and 88a on both sides in the axial direction in the tension rollers 86 and 88 are exposed to the outside form the circular concave bearing portion provided on the side wall portion of the housing 80.

Although not particularly limited, it is preferable that the pressing member 87 is covered by an elastic member. It is preferable that the Shore A hardness of the elastic member is 10 or more to 60 or less, and 10 or more to 50 or less is more preferable. In so doing, it is possible for the pressing member 87 and the absorption member 30 to bend when pressed, and the absorption member 30 is pushed inward with respect to the concave-convex surface formed from the nozzle forming surface 37. In a case where there is a nozzle plate cover, it is possible to press the absorption member inward with respect to the angle (gap) between the nozzle forming surface 37 and the nozzle plate cover projecting therefrom, and possible to suppress the accumulation of ink. Therefore, the cleaning properties are further improved.

Absorption Member

The absorption member 30 is not particularly limited, as long as it is able to absorb the ink composition attached to the discharge ports of the nozzles and the nozzle forming surface 37. In so doing, in a case where the nozzle forming surface 37 is cleaned, the ink composition is absorbed in the absorption member, and the ink composition does not remain on the surface of the absorption member. Therefore, the water repellent film is suppressed from being damaged by the thickened ink composition.

Although not particularly limited, examples of absorption member 30 include a fabric, a sponge, and pulp. Among these, a fabric is preferable. The absorption member easily bends if a fabric is used, and in a case where a nozzle plate cover 35 is provided, ink attached to the nozzle forming surface 37 is more easily wiped off. Although not particularly limited, examples of the fabric include those made from cupra, polyester, polyethylene, polypropylene, lyocell, and rayon. In this case, in particular, since there is little fluff when the material of the absorption member is a non-woven fabric (polyester) or cupra, ink is not easy absorbed from the nozzles, and dot omission less easily occur, and therefore is preferable.

It is preferable that the thickness of the absorption member 30 is 0.1 mm or more to 3 mm or less. By the thickness being 0.1 mm or more, ink is more easily held. By the thickness being 3 mm or less, the absorption member is more compact, size reductions are possible in the cleaning unit overall, and mechanical transport of the cleaning member becomes easier.

It is preferable that the surface density of the absorption member 30 is 0.005 g/cm$^2$ or more to 0.15 g/cm$^2$ or less. 0.02 g/cm$^2$ or more to 0.13 g/cm$^2$ or less is more preferable. By being in the above ranges, the maintenance liquid is more easily held. In order to hold the maintenance liquid, it is preferable that the absorption member uses a non-woven fabric for which the surface density and thickness are easily designed.

Maintenance Liquid

In the cleaning operation using the absorption member 30, it is preferable that the maintenance liquids are used together. The maintenance liquid may be impregnated in the absorption member 80 in advance, may coat the absorption member 30 during the cleaning operation, and may directly coat the nozzle forming surface 37. By using the maintenance liquid, it is possible for the ink composition fixed to the nozzle forming surface 37 to be dissolved, and the wiping properties of the ink composition to be improved, and it is possible to suppress the water repellent film from being damaged. It is preferable that the maintenance liquid includes a penetrant or a moisturizing agent. The maintenance liquid is not particularly limited, as long as the maintenance liquid is able to dissolve the solid components in the ink composition.

The surface tension is 45 mN/m or less, and 35 mN/m or less is preferable. When the surface tension is low, the permeability of the ink composition in the absorption member 30 is favorable, and the wiping properties improve. Examples of the method of measuring the surface tension include a method of measuring at a liquid temperature of 25° C. with the Wilhelmy method using a generally used surface tensiometer (for example, a CBVP-Z surface tensiometer manufactured by Kyowa Interface Science Co., Ltd.).

In a case where the absorption member 80 is impregnated with the maintenance liquid, it is preferable that the content of the maintenance liquid is 10 mass % or more and 200 mass % or less with respect to 100 mass % of the absorption member, 10 mass % to 120 mass % or less is more preferable, and 30 mass % to 100 mass % is still more preferable. By being 10 mass % or more, it is possible for the solid content of the ink composition to be dissolved and to improve the wiping properties of the ink composition, and possible to further suppress the water repellent film from being damaged. By being 200 mass % or less, it is possible to suppress the maintenance liquid from remaining on the nozzle forming surface, and possible to further suppress dot omissions stemming from foam infiltrating the nozzle along with the maintenance liquid and dot omission stemming from the maintenance liquid itself infiltrating the nozzle.

In addition, although not particularly limited, examples of additives (components) included in the maintenance liquid include resins, anti-foaming agents, surfactants, water, organic solvents, and pH adjusters. Each of these components may be used singly, or two or more types may be used together, and the contents thereof are not particularly limited.

When the maintenance liquid includes an anti-foaming agent, it is possible to effectively prevent the maintenance liquid remaining on the nozzle forming surface 37 after the cleaning process from foaming. Although there are cases where the maintenance liquid includes large amounts of acidic moisturizing agents such as polyethylene glycol or glycerin, when the maintenance liquid includes a pH adjuster in these cases, it is possible to avoid the acidic maintenance liquid from contacting the ink composition (normally basic with a pH or 7.5 or more). In so doing, it is possible to prevent the ink composition from shifting to the acidic side, and the storage stability of the ink composition is better ensured.

As the moisturizing agent included in the maintenance liquid, it is possible to use any one generally usable in ink or the like without particular limitation. Although the moisturizing agent is not particularly limited, it is possible to use a high boiling point moisturizing agent for which the boiling point corresponding to one atmosphere of 180° C. or more is preferable, and 200° C. or more is more preferable. When the boiling point is within the above range, it is possible to prevent the volatile components in the maintenance liquid from volatilizing, and possible for the ink composition that contacts the maintenance liquid to be reliably wet, and effectively wiped.

Although not particularly limited, examples of high boiling point moisturizing include ethylene glycol, propylene glycol, diethylene glycol, triethylene glycol, pentamethylene glycol, trimethylene glycol, 2-butene-1,4-diol, 2-ethyl-1,3-hexane diol, 2-methyl-2,4-pentanediol, tripropylene glycol, polyethylene glycol, polypropylene glycol, 1,3-propylene glycol, isopropylene glycol, iso-butylene glycol, glycerin, meso-erythritol, and pentaerythritol.

These moisturizing agents may be used singly or two or more types may be used as a mixture. It is preferable that the content of the moisturizing agent is 10 to 100 mass % with respect to the total amount (100 mass %) of the maintenance liquid. The content of the moisturizing agent being 100 mass % with respect to the total amount of the maintenance liquid indicates that all components of the maintenance liquid are moisturizing agents.

The penetrant from among the additives included in the maintenance liquid will be described. Although it is possible to use the penetrant without particular limitation as long as the penetrant is generally usable in ink or the like, in a solution of 90 mass % of water and 10 mass % of the penetrant, it is possible to employ a penetrant with a solution surface tension of 45 mN/m or less. Although not particularly limited, examples of the penetrant include at least one type selected form a group consisting of alkane diols with 5 to 8 carbon atoms, glycol ethers, acetylene glycol-based surfactants, siloxane-based surfactants, and fluorine-based surfactants. It is possible to perform measurement of the surface tension with the above method.

It is preferable that the content of the penetrant in the maintenance liquid be 1 mass % or more to 40% or less, and 3 mass % or more to 25 mass % or less is more preferable. By being 1 mass % or more, the wiping properties tend to be superior, and by being 40 mass % or less, it is possible to avoid the penetrant attacking the pigment included in the ink in the vicinity of the nozzles, and the dispersion stability breaking down, thereby causing aggregation.

Although not particularly limited, examples of alkane diols with 5 to 8 carbon atoms include 1,2-pentanediol, 1,5-pentanediol, 1,2-hexanediol, 1,6-hexanediol, 1,2-heptanediol, 2-ethyl-1,3-hexanediol, 2,2-dimethyl-1,3-propanediol, and 2,2-dimethyl-1,3-hexanediol. The alkane diols with 5 to 8 carbon atoms may be used singly, or two or more types may be used together.

Although not particularly limited, examples of the glycol ether include ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, propylene glycol monomethyl ether, propylene glycol mono ethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol monomethyl-n-propyl ether, dipropylene glycol monomethyl-iso-propyl ether, diethylene glycol dimethyl ether, diethylene glycol diethyl ether, diethylene glycol dibutyl ether, diethylene glycol ethyl methyl ether, diethylene glycol butyl methyl ether, triethylene glycol dimethyl ether, tetraethylene glycol dimethyl ether, dipropylene glycol dimethyl ether, dipropylene glycol diethyl ether, tripropylene glycol dimethyl ether, ethylene glycol mono iso-hexyl ether, diethylene glycol mono iso-hexyl ether, triethylene glycol mono iso-hexyl ether, ethylene glycol mono iso-heptyl ether, diethylene glycol mono iso-heptyl ether, triethylene glycol mono iso-heptyl ether, ethylene glycol mono iso-octyl ether, diethylene glycol mono iso-octyl ether, triethylene glycol mono iso-octyl ether, ethylene glycol mono-2-ethylhexyl ether, diethylene glycol mono-2-ethylhexyl ether, triethylene glycol mono-2-ethylhexyl ether, diethylene glycol mono-2-ethyl-pentyl ether, ethylene glycol mono-2-ethyl-pentyl ether, ethylene glycol mono-2-methyl-pentyl ether, and diethylene glycol mono-2-methyl-pentyl ether. The glycol ethers may be used singly, or two or more types may be used together.

Although not particularly limited, examples of acetylene glycol-based surfactants include the compounds represented by the following formula.

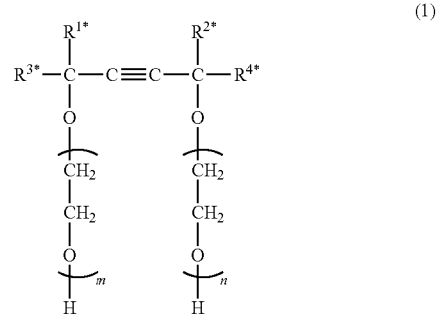

[In the formula (1) 0≤m+n≤50, $R^{1*}$, $R^{2*}$, $R^{3*}$, and $R^{4*}$ each independently represent an alkyl group (an alkyl group with 1 to 6 carbon atoms is preferable).]

Among the acetylene glycol-based surfactants represented by formula (1), preferable examples include 2,4,7,9-tetramethyl-5-decyne-4,7-diol, 3,6-dimethyl-4-octyne-3,6-diol, and 3,5-dimethyl-1-hexyne-3-ol. Commercially available products can be used as the acetylene glycol-based surfactant represented by formula (1), and examples thereof include Surfynol 82, 104, 440, 465, 485, or TG, (all obtainable from Air Products and Chemicals. Inc.), and Olfine STG and Olfine E1010 (product names)(all manufactured by Nissin Chemical Industry Co., Ltd.). The acetylene glycol-based surfactants may be used individually, or two or more types may be used together.

Although not particularly limited, examples of siloxane-based surfactants include those represented by the following formulae (2) or (3).

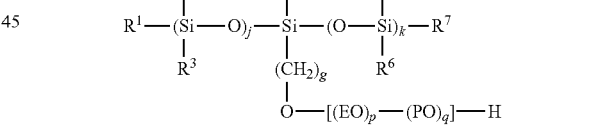

[In formula (2), $R^1$, $R^2$, $R^3$, $R^4$, $R^5$, $R^6$, and $R^7$ each independently represents an alkyl group with 1 to 6 carbon atoms, and a methyl group is preferable. Although j and k each independently represent an integer of 1 or more, 1 to 5 is preferable, 1-4 is more preferable, and 1 or 2 is still more preferable, it is preferable for j=k=1 or k=j+1 to be satisfied. g represents an integer of 0 or more, 1 to 3 is preferable, and 1 is more preferable. p and q each represent an integer of 0 or more, and 1 to 5 is preferable. Wherein p+q is an integer of 1 or more, and p+q being 2 to 4 is preferable.]

It is preferable that the siloxane-based surfactant represented by formula (2) is a compound where $R^1$ to $R^7$ all represent a methyl group, j represents 1 to 2, k represents 1 to 2, g represents 1 to 2, p represents an integer of 1 or more to 5 or less, and q is 0.

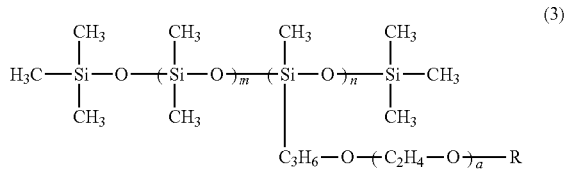

(3)

[In formula (3), R represents a hydrogen atom or a methyl group, a represents an integer of 2 to 18, m represents an integer of 0 to 50, and n represents an integer of 1 to 5.]

Although not particularly limited, preferable examples of the siloxane-based surfactants represented by formula (3) include compounds where R represents a hydrogen atom or a methyl group, a represents an integer of 7 to 11, m represents an integer of 30 to 50, and n represents an integer of 3 to 5, compounds where R represents a hydrogen atom or a methyl group, a represents an integer of 9 to 13, m represents an integer of 2 to 4, and n represents an integer of 1 to 2, compounds where R represents a hydrogen atom or a methyl group, a represents an integer of 6 to 18, m represents an integer of 0, and n represents an integer of 1, and compounds where R represents a hydrogen atom, a represents an integer of 2 to 5, m represents an integer of 20 to 40, and n represents an integer of 3 to 5.

Siloxane-based surfactants that are commercially available on the market may be used, and examples thereof include Olfine PD-501 (manufactured by Nissin Chemical Industry Co., Ltd.), Olfine PD-570 (manufactured by Nissin Chemical Industry Co., Ltd.), BYK-347 (manufactured by BYK-Chemie Japan Co., Ltd.), and BYK-348 (manufactured by BYK-Chemie Japan Co., Ltd.). The siloxane-based surfactants may be used singly, or two or more types may be used together.

Fluorine-based surfactants are known to exhibit favorable wettability with respect to a low absorbency or non-absorbent recording medium as disclosed in WO2010/050618 and WO2011/007888. Although not particularly limited, the fluorine-based surfactant is able to be selected, as appropriate, according to the purpose, and examples thereof include perfluoroalkylsulfonates, perfluoroalkyl carboxylates, perfluoroalkylphosphoric acid esters, perfluoroalkylethylene oxide adducts, perfluoroalkylbetaines, and perfluoroalkylamine oxide compounds.

As other fluorine-based surfactants, those synthesized as appropriate may be used, or commercially available products may be used. Examples of commercially available products include S-144 and S-145 (manufactured by Asahi Glass), FC-170C, FC-430, and Fluorad FC 4430 (manufactured by Sumitomo 3M Limited), FSO, FSO-100, FSN, FSN-100, and FS-300 (manufactured by Dupont), and FT-250, 251 (manufactured by Neos Company Limited). Among these, FSO, FSO-100, FSN, FSN-100, and FS-300 manufactured by Dupont are preferable. The fluorine-based surfactants may be used singly, or two or more types may be used together.

The ink jet recording apparatus according to the embodiment performs wiping of the ink by the wiper cassette 31 that includes the absorption member 80 being moved by the movement mechanism 33 or by the recording head 31 being moved by the driving mechanism of the recording head 31, in a state where the absorption member 80 is pushed against the nozzle forming surface 37 by the pressing member 87 in the cleaning operation of the nozzle forming surface 37. Therefore, the pressing member 87, the movement mechanism 33, and the driving mechanism of the recording head 31 correspond to the driving mechanism in the invention.

It is preferable for the pressing member 87 to relatively press the absorption member 30 and the nozzle forming surface 37 so that the linear pressure reaches 8 gf/cm to 150 gf/cm. A linear pressure of 30 gf/cm to 120 gf/cm is more preferable. By the linear pressure being 8 gf/cm or more, the ink wiping properties are excellent. Even in a case of a difference between the nozzle plate and the nozzle plate cover, attachment and accumulation of ink in the gap is prevented, or removal of the ink from the gap is excellent. By the linear pressure being 150 gf/cm or less, the storage properties of the liquid repellent film significantly superior. The recording head 2 may be driven so that the recording head 2 is pressed with respect to the nozzle forming surface 37.

In the cleaning operation, it is preferable that the absorption member 30 and the recording head 2 are relatively moved at a speed of 1 cm/s or more and 10 cm/s or less. By being in this range, the cleaning properties and the storage properties of the liquid repellent film are further improved. Although the speed of the cleaning operation is slow speed of approximately one-fifth to one-twentieth compared to the speed the recording head ordinarily moves when recording an image, there is no limitation on the speed relationship.

Ink Composition

The ink jet recording apparatus of the embodiment includes an ink composition containing a pigment and a resin and not substantially containing an alkyl polyol with a standard boiling point of 280° C. or higher, the resin is a core-shell resin including a core polymer and a shell polymer, and the glass transition temperature of the shell polymer is higher than the glass transition temperature of the core polymer.

Below, additives (components) included in or that can be included in the ink composition of the embodiment are described.

Pigment

In the embodiment, it is possible to improve the light resistance of the ink by using a pigment as the coloring material. It is possible for the pigment to use either of an inorganic pigment or an organic pigment.

Although not particularly limited, examples of the inorganic pigment include carbon black, iron oxide, titanium oxide and silica oxide. These inorganic pigments may be used singly, or two or more may be used in combination.

Although not particularly limited, examples of the organic pigment include quinacridone-based pigments, quinacridonequinone-based pigments, dioxazine-based pigments, phthalocyanine-based pigments, anthrapyrimidine-base pigments, anthanthrone-based pigments, indanthrone-based pigments, flavanthrone-based pigments, perylene-base pigments, diketo-pyrrolo-pyrrole-based pigments, perinone-based pigments, quinophthalone-based pigments, anthraquinone-based pigments, thioindigo-based pigments, benzimidazolone-based pigments, isoindolinone-based pigments, azomethine-based pigments and azo-based pigments. Specific examples of the organic pigment include those below.

Although not particularly limited, examples of pigment used in the black ink include carbon black. Although not particularly limited, examples of carbon black include furnace black, lamp black, acetylene black, and channel black (C.I. Pigment Black 7).

Examples of the pigment used in the cyan ink include C.I. Pigment Blue 1, 2, 3, 15, 15:1, 15:2, 15:3, 15:4, 15:6, 15:34, 16, 18, 22, 60, 65, and 66, and C.I. Vat Blue 4 and 60. Among these, at least either of C.I. Pigment Blue 15:3 and 15:4 is preferable.

Examples of the pigment used in the magenta ink include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48:2, 48:4, 57, 57:1, 88, 112, 114, 122, 123, 144, 146, 149, 150, 166, 168, 170, 171, 175, 176, 177, 178, 179, 184, 185, 187, 202, 209, 219, 224, 245, 254, and 264 and C.I. Pigment Violet 19, 23, 32, 33, 36, 38, 43, and 50. Among these, at least one type selected from a group consisting of C.I. Pigment Red 122, C.I. Pigment Red 202, and C.I. Pigment Violet 19 is preferable.

Examples of the pigment used in the yellow ink include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 150, 151, 153, 154, 155, 167, 172, 180, 185, and 213. Among these, at least one type selected from a group consisting of C.I. Pigment Yellow 74, 155, and 213 is preferable.

Although not particularly limited, examples of the pigment used in the white ink include C.I. Pigment White 6, 18, and 21, titanium oxide, zinc oxide, zinc sulfide, antimony oxide, zirconium oxide, and white hollow resin particles and polymer particles.

Examples of pigments used in other colors of ink, such as green ink and orange ink, include pigments known in the related art.

It is preferable that the content of the pigment is 0.4 mass % to 12 mass % with respect to the total amount (100 mass %) of the ink, and 2 mass % to 5 mass % is more preferable.

Water

The ink composition of the embodiment includes water. Examples of the water include, pure waters such as ion-exchanged water, ultrafiltered water, reverse osmosis water, and distilled water, and from which as many impurities are removed as far as possible, such as ultrapure water. When water sterilized by ultraviolet irradiation, the addition of hydrogen peroxide, or the like is used, it is possible to prevent the occurrence of mold and bacteria when the pigment dispersion liquid and the ink using the pigment dispersion liquid are stored over the long term.

The content of the water is not particularly limited, and may be appropriately determined as necessary.

Core-Shell Resin

The core-shell resin has a core-shell structure that includes a core polymer and a shell polymer, and the glass transition temperature of the shell polymer is higher than the glass transition temperature of the core polymer.

A core-shell structure refers to a structure in which a core polymer is formed in the interior of a void of a shell polymer. Accordingly, not only a structure in which the shell polymer covers the surface of the core polymer, but also a structure in which a portion of the interior of the void of a three-dimensional mesh structure by the shell polymer is filled with the core polymer. Accordingly, the wording core-shell structure in the description also includes a core-shell resin in which the boundary between the core portion and the shell portion is not strictly obvious.

As one characteristic of the core-shell resin, the resin has the properties of excellent the redispersion properties and easily recovering from nozzle clogging, compared to a resin used for improving the fixing properties of an ink composition of the related art. Therefore, an ink using the core-shell resin with excellent redispersion properties has excellent wiping properties during wiping, and there is little thickened material imprinted in the nozzles during the wiping operation. Even in cases of being imprinted, since the resin is easily redispersed in the nozzles, there is an advantage of there being no adverse influence on the discharge. Even in cases where the core-shell resin is attached and solidified with the pigment to the nozzle forming surface, the attached matter is easily softened by the core-shell resin being easily redispersed, and it is possible for deterioration of the liquid repellent film to be reduced during wiping.

Core Polymer

Although the glass transition temperature of the core polymer is not particularly limited as long as it is lower than the glass transition temperature of the shell polymer, the glass-transition temperature is less than 60° C., and 0° C. or higher and less than 60° C. is preferable. By the glass-transition temperature of the core polymer being less than 60° C., because it is possible for the core polymer to easily flow out after the shell polymer is softened, the adhesiveness is excellent. By the glass-transition temperature of the core polymer being 0° C. or higher, the storage stability of the ink composition is excellent. From the viewpoint of forming a core polymer film, it is preferable for the glass transition temperature of the core polymer to be made lower than the heating temperature of the recording medium after discharge of the ink composition.

The glass transition point (below, referred to as Tg) is calculated using viscoelasticity measurement or analytic methods such as thermal analysis, or from the Tg of a known homopolymer of polymerizable monomer using a calculation formula. In a case where the core polymer and the shell polymer, described later, are copolymers, it is possible to calculate the glass transition temperature (Tg) of the copolymer from the $Tg_n$ (unit: K) of the various homopolymers and the mass fraction ($W_n$) of the monomer using the FOX formula below.

$$\frac{1}{Tg} = \frac{W_1}{Tg_1} + \frac{W_2}{Tg_2} + \ldots + \frac{W_n}{Tg_n}$$

Here, $W_n$: mass fraction of each monomer
$Tg_n$: Tg of homopolymer of each monomer (unit: K)
Tg: Tg of the copolymer (unit: K)

In other words, it is possible to control the glass transition point of the core polymer or the shell polymer by selecting the homopolymer thereof in cases where the polymer is a homopolymer. In cases where the polymer is a copolymer, control is possible by taking the Tg of the homopolymer and the FOX formula above into consideration.

The core polymer is designed to be a polymer with a high hydrophobicity. Therefore, a core polymer without an acid value is preferable. It is preferable that the core polymer includes at least an aromatic vinyl compound monomer as a constituent unit. In so doing, the core polymer becomes hydrophobic and it is possible to form a hydrophobic film. As a result, it is possible to improve the water and friction resistance that is one abrasion resistance in the recorded image.

Although not particularly limited, preferable examples of the core polymer include polymers having at least a hydrophilic(meth)acrylate monomer, a hydrophobic(meth)acrylate monomer unit having an alkyl group with 3 or more carbon atoms, a hydrophobic(meth)acrylate monomer unit having a ring structure, a (meth)acrylamide monomer unit or an N-substituted derivative thereof, and a carboxylic acid monomer unit as constituent units.

Although not particularly limited, examples of the aromatic monomer include styrene, α-methylstyrene, p-methylstyrene, vinyl toluene, chlorostyrene, and divinylbenzene.

Although not particularly limited, examples of the hydrophilic(meth)acrylate monomer include methyl(meth)acrylate, ethyl(meth)acrylate, α-hydroxymethyl(meth)acrylate, 2-hydroxyethyl(meth)acrylate, (poly)ethylene glycol(meth)acrylate, methoxy(poly)ethylene glycol(meth)acrylate, ethoxy(poly)ethylene glycol(meth)acrylate, and (poly) propylene glycol(meth)acrylate. Among these, methyl(meth)acrylate and ethyl(meth)acrylate are preferable. Here, the wording "hydrophilic" indicates the solubility with respect to 100 mL of water (20° C.) is 0.3 g or more.

Although not particularly limited, examples of the hydrophobic(meth)acrylate monomer having an alkyl group with 3 or more carbon atoms include (meth)acrylates having an alkyl group with 3 or more carbon atoms such as n-propyl(meth)acrylate, isopropyl(meth)acrylate, n-butyl(meth)acrylate, isobutyl(meth)acrylate, n-amyl(meth)acrylate, isoamyl (meth)acrylate, hexyl(meth)acrylate, 2-ethylhexyl(meth)acrylate, n-octyl(meth)acrylate, nonyl(meth)acrylate, decyl (meth)acrylate, lauryl(meth)acrylate, stearyl(meth)acrylate, cetyl(meth)acrylate, neopentyl(meth)acrylate, and behenyl (meth)acrylate. Among these, lauryl(meth)acrylate is preferable. Here, the wording "hydrophobic" indicates the solubility with respect to 100 mL of water (20° C.) is less than 0.3 g.

Although not particularly limited, examples of the hydrophobic(meth)acrylate monomer having a ring structure include cyclohexyl(meth)acrylate, dicyclopentanyl(meth)acrylate, dicyclopentanyl(meth)acrylate, dicyclopentanyl oxyethyl(meth)acrylate, isobornyl(meth)acrylate, norbornyl (meth)acrylate, adamantyl(meth)acrylate, and tetrahydrofurfuryl(meth)acrylate.

Although not particularly limited, examples of the (meth)acrylamide monomer or N-substituted derivatives thereof include (meth)acrylamide, N-hydroxymethyl(meth)acrylamide, diacetone acrylamide, and N,N-dimethyl acryl(meth)amide.

Although not particularly limited, examples of the carboxylic acid monomer include (meth)acrylic acid, crotonic acid, maleic acid, fumaric acid, and itaconic acid. Among these, (meth)acrylic acid is preferable. The wording "carboxylic acid monomer" refers to a polymerizable monomer having a carboxyl group and a polymerizable unsaturated group.

These monomers may be used singly, or two or more types may be used together.

It is preferable that the repeating unit derived from a hydrophobic monomer from all the repeating units that configure the core polymer is 60 mass % or more, 75 mass % or more is more preferable, and 90 mass % or more is still more preferable. By the content of the repeating unit derived from the hydrophobic monomer unit being in the above range, since a hydrophobic film is formed on the surface of the image recorded on the recording medium by performing heat treatment or the like, the abrasion resistance of the recording material tends to further improve.

Shell Polymer

The glass transition temperature of the shell polymer is set higher than the glass transition temperature of the core polymer. In so doing, the core-shell structure is maintained even if the core polymer is softened, and it is possible to suppress attachment of the core-shell resin in the nozzles.

It is preferable that the glass transition temperature of the shell polymer is higher than the heating temperature of the recording medium when discharging the ink composition. The glass transition temperature of such a shell polymer is 60° C. or higher, and 60° C. or higher to 150° C. or lower is preferable. In so doing, in a case where the ink composition is discharged in a high temperature environment, it is possible to discharge the core-shell resin from the recording head without the core-shell structure collapsing, and because it is possible to better suppress attachment of the core-shell resin in the nozzles, it is possible to prevent clogging of the nozzles, and the stability of intermittent printing tends to be still better. In a case of forming a film on the recording medium, by heating the ink composition on the recording medium to a higher temperature than the glass transition temperature of the shell polymer, the core polymer flows out from the softened shell polymer, and a coating film is formed on the recording medium by the core polymer and the shell polymer. At this time, by the core polymer in a softened state adhering while spreading on the recording medium, a coating film with excellent fixing properties is formed. By the glass transition temperature of the shell polymer being 150° C. or lower, because the shell polymer is easily softened on the recording medium, the adhesiveness tends to further improve. Meanwhile, when the glass transition temperature of the shell polymer exceeds 150° C., the thermal deformation of the shell polymer becomes worse, and there is concern of incurring adverse influence such as thickening of the system. In this way, from the viewpoint of maintaining the core-shell structure in the nozzles, it is preferable that the difference between the glass transition temperatures of the core polymer and the shell polymer is 10° C. or higher.

The shell polymer has an acid value by being hydrophilic, and an acid value of the shell polymer of 20 mgKOH/g to 120 mgKOH/g is preferable. By having an acid value in the above numerical range, it is possible to ensure a sufficient hydrophilicity necessary as a shell polymer.

The shell polymer includes an aromatic monomer as a constituent unit. By the shell polymer including an aromatic monomer as a constituent unit, even though the detailed mechanism of action is unclear, discharge bending is prevented. In particular, since the ink droplets easily bend when dots are small, discharge bending is suppressed according to the embodiment. Accordingly, one aspect of the ink composition of the embodiment is particularly suitable to a head able to discharge multiple sizes of ink dots from one nozzle. By the shell polymer including the comparatively hard aromatic monomer, it is possible for the water and abrasion resistance (wet abrasion resistance) of the coating film formed on the recording medium to be improved.

It is preferable that the shell polymer includes a (meth)acrylate monomer and a carboxylic acid monomer as constituent units. By using such a monomer, it is possible for a carboxyl group to be present in the surface of the shell polymer. In so doing, the dispersion stability of the core-shell resin further improves, and because the viscosity of the ink composition becomes comparatively low, the discharge stability further improves. Although not particularly limited, examples of (meth)acrylate monomer include a hydrophilic (meth)acrylate monomer, a hydrophobic(meth)acrylate monomer having an alkyl group with 3 or more carbon atoms and a hydrophobic(meth)acrylate monomer having a ring structure. Specific examples of the (meth)acrylate monomer and the carboxylic acid monomer include the ones described above for the monomer that configures the core polymer, and these monomers may be used singly, or two or more types may be used together.

It is preferable that the ratio (aromatic monomer/carboxylic acid monomer) of the aromatic monomer with respect to the carboxylic acid monomer in the shell monomer is 0.15 is more preferable. In so doing, an ink composition with an excellent balance between improvement in the abrasion resistance due to the aromatic monomer and the redispersion properties due to the carboxylic acid monomer is obtained.

It is preferable that the content of the repeating unit derived from (meth)acrylic acid ester and unsaturated carboxylic acid from all the repeating unit that configure the shell polymer is 20 mass % or more, 30 mass % or more is more preferable, and 35 mass % or more is still more preferable.

It is preferable that the content of the repeating unit derived from a hydrophilic monomer from all the repeating units that configure the shell polymer is 20 mass % or more, 30 mass % or more is more preferable, and 35 mass % or more is still more preferable. By the content of the repeating unit derived from a hydrophilic monomer being in the above range, since the shell polymer has hydrating properties, the dispersion stability of the core-shell resin in the ink composition tends to improve. Since it is possible to more effectively suppress adhering of the core-shell resin to the nozzle, the discharge stability from the nozzles of the recording head tends to be more favorable.

It is preferable that the content of the repeating unit derived from a hydrophobic monomer from all the repeating units that configure the shell polymer is 10 mass % or more, 20 mass % or more is more preferable, and 30 mass % or more is still more preferable. By the content of the repeating unit derived from a hydrophobic monomer being in the above range, even in cases where the drying of the water progresses and the occupancy ratio of the organic solvent increases in the recording head and on the recording medium, the dispersion of the core-shell resin tends to be stable, and suppression of aggregation of the core-shell resin to themselves tends to be possible.

Overall Core-Shell Resin

It is preferable that the core-shell resin includes 10 mass % or more to 80 mass % or less (with the mass of the overall core-shell resin as a standard) of the aromatic monomer as a constituent unit when combining the core polymer and shell polymer. By the including 10 mass % or more to 80 mass % or less of the comparatively hard aromatic monomer, it is possible for the water and abrasion resistance (wet abrasion resistance) of the coating film formed on the recording medium to be improved.

As described above, the resin is prepared so that the acid value of the core shell resin is 50 mgKOH/g or more. The core shell resin being 50 mgKOH/g or more, since it is possible for the redispersion properties with respect to water to be improved, the clogging recovery is excellent, and the capacity to prevent nozzle clogging (clogging recovery) over the long term is improved.

It is preferable that the average particle diameter of the core-shell resin is 10 nm or more to 100 nm or less. By the average particle diameter of the core-shell resin being comparatively small, characteristics such as the ease of imparting glossiness of the recorded image, and excellent film forming properties are exhibited. By the average particle diameter of the core-shell resin being comparatively small, since it is difficult for large lumps to form even if aggregation occurs, it is possible for clogging of the nozzles to be suppressed. By the average particle diameter of the core-shell resin being small, it is possible for the viscosity of the ink composition to be comparatively increased, and even if the temperature of the ink composition in the recording head rises, it is possible for lowering of the viscosity to such an extent that the ink discharge properties become unstable to be avoided.

The average particle diameter in the specification, as long as not specifically indicated, is the volumetric based. As the measurement method, it is possible to perform measurement with a particle size distribution analyzer in which a laser diffraction scattering method is the measurement principle. Examples of the particle size distribution analyzer include a particle size distribution meter (for example, Microtrac UPA manufactured by Nikkiso, Co, Ltd.) in which dynamic light scattering is the measurement principle.

It is preferable that the ratio of the mass of the core polymer and the mass of the shell polymer in the core-shell resin is mass of core polymer≤mass of shell polymer, and mass of core polymer<mass of shell polymer is more preferable. Still more preferable is a mass of the core polymer of 40% to 80% in a case where the mass of the shell polymer is made 100%. In so doing, because the balance between the mass of the core polymer and the mass of the shell polymer is favorable, the fixing properties of the ink composition are favorable, the discharge stability is favorable, and vertical alignment defects tend to not easily occur. Vertical alignment defects tend to not easily occur. Vertical alignment defects are a phenomenon where the ink at the peripheral edge of the nozzle partially solidifies due to long-term discharge, and a vertical line with a smooth curve in the discharge direction becomes difficult to print during continuous discharge of the ink.

It is preferable that the content (solid conversion) of the core-shell resin is 0.5 mass % or more to 20 mass % or less with respect to the total mass (100 mass %) of the ink composition, 0.6 mass % or more to 15 mass % or less is more preferable, and 0.7 mass % or more to 10 mass % or less is still more preferable. By the content of the core-shell resin being 0.5 mass % or more, the abrasion resistance and adhesiveness tend to further improve. By the content of the core-shell resin being 20 mass % or less, the discharge stability tends to further improve.

Method of Manufacturing of Core-Shell Resin

Although the method of manufacturing of the core-shell resin described above is not limited, it is preferable that the core-shell resin is formed by soap-free polymerization not substantially using an emulsifier. Soap-free polymerization refers to a method of polymerization for manufacturing the core-shell polymer substantially without using an emulsifier. Herein, the term "emulsifier" signifies a surfactant used in synthesis. Examples of the soap-free polymerization include polymerizing the core-shell resin in the presence of an emulsifier content of 1 mass % or less in the solution. In the related art, an ink composition that includes a core-shell resin synthesized using such an emulsifier has problems of easily foaming, not easily exhibiting gloss in the image, and of foreign material easily occurring. According to an aspect of the invention, an ink composition in which the occurrence of such problems is suppressed is obtained. In the soap-free polymerization, the shell polymer including (meth)acrylic acid as a constituent unit is formed, and the core is formed in the shell polymer. In a case of manufacturing the core-shell resin using soap-free polymerization, the average particle diameter becomes extremely small, and the discharge stability and glossiness of the ink composition improve.

Although not particularly limited, anionic surfactants and nonionic surfactants are suitable as surfactants used in the synthesis. Examples of the anionic surfactant include sodium dodecylbenzenesulfonate, sodium lacrylate, polyoxyethylene alkyl ether sulfate and ammonium salt. Examples of the nonionic surfactant include polyoxyethylene alkyl ether, polyoxyethylene alkyl ester, polyoxyethylene sorbitan fatty acid ester, polyoxyethylene alkyl phenyl ether, polyoxyethylene alkyl amine, and polyoxyethylene alkyl amide. The core-shell polymer used in the embodiment is manufactured without using these surfactants.

Although not particularly limited, a hydrophilic initiator is used as the polymerization initiator used in the soap-free polymerization and examples thereof include potassium persulfate, ammonium persulfate, and hydrogen peroxide.

Although an example of the method of soap-free polymerization is described, the method of synthesis is not limited to the following. For example, in a nitrogen atmosphere in which pressure is returned to atmospheric pressure with nitrogen after introducing ion exchange water and a polymerization initiator are introduced into a jacketed polymerization reaction vessel, and reducing the pressure of the interior of the polymerization vessel, thereby removing the oxygen, first the polymerization vessel is brought to a predetermined temperature, then the polymerization reaction is carried out by the dropwise addition a fixed amount at a time of pre-emulsion solution including a monomer that is a constituent element of the shell polymer, thereby synthesizing the shell polymer. Next, the obtained void of the shell polymer is polymerized, the core polymer is polymerized, thereby synthesizing the core-shell resin according to the embodiment. Specifically, the monomer mixture that includes the above-described hydrophobic monomer is added dropwise to the aqueous dispersion medium containing the shell polymer, and the core polymer is polymerized, thereby forming the core-shell resin. In this way, in a case of polymerizing the core polymer in the base of the shell polymer, using the emulsifier in the monomer mixture becomes unnecessary.

According to the soap-free polymerization, it is possible to easily make the content of the emulsifier in the ink composition 0.01 mass % or less, and it is possible for the average particle diameter of the core-shell resin to also be made minute.

Wax Particles

The ink composition of the embodiment may contain wax particles. In a case where the recording head is heated, the core-shell resin aggregates and fixes according to the evaporation of the water content, nozzle clogging is caused in the recording head, and there is a possibility interfering with stable discharge. In contrast, when wax particles with the above-described melting point are used together, aggregation of the core-shell resin when the water content evaporates is suppressed. In so doing, it is possible for discharge defects and nozzle clogging due to fixing of the core-shell resin to the nozzles of the recording head to be suppressed, and the ink composition attains excellent recording stability. During high temperature recording, the wax particles suppress the coating film becoming excessively brittle due to the core-shell resin. Therefore, even in high temperature recording, the abrasion resistance of the ink composition is not easily deteriorated.

It is preferable that the melting point of the wax particles is 70° C. or higher to less than 110° C., and 80C° C. or higher to 110° C. or lower is more preferable. By the melting point being within the above ranges, the recording stability is superior, and it is possible to obtain a recorded material for which the abrasion resistance does not easily deteriorate even during high temperature recording. It is possible to measure the melting point with a differential scanning calorimeter (DSC). It is possible to control the melting point of the wax particles by adjusting the ratio of the plurality constituent units that configure the wax particles.

The wax particles include polyethylene wax particles. Although not particularly limited, examples of the polyethylene wax particles having a melting point of 70° C. or higher to less than 110° C. include AQUACER593 polyolefin wax (manufactured by BYK Japan), Nopcote PEM-17 (manufactured by San Nopco Limited), Polyron L787 and Polyron L788 (manufactured by Chukyo Yushi Co., Ltd.), and Chemipearl W4005 (manufactured by Mitsui Chemicals, Inc.). The polyethylene wax particles having a melting point of 70° C. or higher to less than 110° C. may be synthesized by normal methods.

These wax particles may be used singly, or two or more may be used in combination.

It is preferable that the addition amount of the wax particles is 0.1 mass % to 2.5 mass % with the total mass of the ink composition as a standard, and 0.2 to 2.0 mass % is more preferable. By the addition amount being within the above ranges, the recording stability is superior, and the abrasion resistance does not easily deteriorate even during high temperature recording.

It is preferable that the average particle diameter of the wax particles is 0.02 μm to 0.5 μm, and 0.04 μm to 0.3 μm is more preferable. By the particle diameter being within the above ranges, the recording stability is superior, and the abrasion resistance does not easily deteriorate even during high temperature recording. It is possible for the average particle diameter to be measured by the same method described for the core-shell resin.

Organic Solvent

The ink composition of the embodiment may include various organic solvent. The ink composition of the embodiment has a standard boiling point of 160° C. or higher to 260° C. or lower, and includes an alkyl polyol with an SP value of 10 $(cal/cm^3)^{1/2}$ or more to 15 $(cal/cm^3)^{1/2}$ based on the Hansen method. The organic solvent with a boiling point of 160° C. to 260° C. evaporates due to heating on the recording medium that is non-absorbent or has low absorbency to ink, and the ink is fixed to the recording medium.

Although not particularly limited, examples of the alkyl polyol with a boiling point of 160° C. to 260° C. include propylene glycol, 1,3-propanediol, 1,2-butanediol, 1,3-butanediol, 1,4-butanediol, 1,2-pentanediol, 1,5-pentanediol, 1,2-hexanediol, and 1,6-hexanediol. Among these, an alkyl polyol with a carbon chain of 5 or less is preferable, and, for example, 1,2-butanediol and 1,3-butanediol are preferable. The alkyl polyol with a carbon chain of 5 or less is strongly hydrophobic. Therefore, even in a state in which the water evaporates due to the heating of the recording head, thereby increasing the concentration of the organic solvent, it is possible to suppress short term clogging, and it is possible to improve the intermittent discharge properties.

It is preferable that the alkyl polyol with an SP value of 10 $(cal/cm^3)^{1/2}$ or more to 15 $(cal/cm^3)^{1/2}$ is 1 mass % or more to 30 mass % or less, and 2 mass % or more to 20 mass % or less is more preferable. In the case of the SP value in the range of 10 $(cal/cm^3)^{1/2}$ or more to 15 $(cal/cm^3)^{1/2}$, the compatibility with the core-shell resin having a hydrophilic functional group on the outside is excellent, and it is possible for the dispersion of the core-shell resin to be made favorable. In particular, the compatibility with the core-shell resin contributed by the carboxyl group is excellent. Therefore, it is possible to improve the intermittent discharge capability, and to prevent the omission of dots.

Although not particularly limited, it is preferable that the content of the alkyl polyol is 5.0 mass % to 35 mass % with respect to the total amount of the ink composition, and 5 mass % to 20 mass % is more preferable.

Cyclic Nitrogen Compound and Aprotic Polar Solvent

The ink composition of the embodiment may further include at least either of a cyclic nitrogen compound and an aprotic polar solvent. By the ink composition including the cyclic nitrogen compound or the aprotic polar solvent, it is possible for the apparent glass transition temperature of the core-shell resin to be migrated to the low temperature side, and, since it is possible for the core polymer and the shell polymer to be softened at a lower temperature than originally, it is possible for the fixing properties of the ink composition to the recording medium to be improved. In so doing, particularly in a case in which the recording medium is made from polyvinyl chloride, it is possible for the fixing properties of the ink composition to the recording medium to be improved.

Although not particularly limited, examples of the aprotic polar solvent include cyclic ketone compounds, chain ketone compounds and chain nitrogen compounds. Examples of the cyclic nitrogen compound and the aprotic polar solvent include pyrrolidone-based, imidazolidinone-based, sulfoxide-based, lactone-based, and amide ether-based ones as representative examples. Among these, 2-pyrrolidone, N-alkyl-2-pyrrolidone, 1-alkyl-2-pyrrolidone, γ-butyrolactone, 1,3-dimethyl-2-imidazolidinone, dimethyl sulfoxide, imidazole, 1-methyl imidazole, 2-methyl imidazole, 1,2-dimethyl imidazole, and alkoxypropionamide are preferable. 2-pyrrolidone and alkoxypropionamide are more preferable.

Although not particularly limited, it is preferable that the content of the cyclic nitrogen compound and aprotic polar solvent is 5.0 mass % to 35 mass % with respect to the total amount of the ink composition, and 5 mass % to 20 mass % is more preferable.

Other Solvents

The ink according in the embodiment may further include other solvents other than the above. Although not particularly limited, examples of other solvents than the above include ethylene glycol, diethylene glycol, triethylene glycol, propylene glycol, dipropylene glycol, 1,3-propanediol, 1,2-butanediol, 1,2-pentanediol, 1,2-hexane diol, 1,4-butanediol, 1,5-pentane diol, 1,6-hexane diol, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol monobutyl ether, diethylene glycol mono-t-butyl ether, propylene glycol monomethyl ether, propylene glycol mono ethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol monomethyl-n-propyl ether, dipropylene glycol monomethyl-iso-propyl ether, methanol, ethanol, n-propyl alcohol, iso-propyl alcohol, n-butanol, 2-butanol, tert-butanol, iso-butanol, n-pentanol, 2-pentanol, 3-pentanol, and alcohols or glycols such as tert-pentanol. These other solvents may be used singly or two or more may be used in combination.

It is preferable that the boiling points of these other solvents are 140° C. to 280° C., 160° C. to 260° C. is more preferable, and 180° C. to 240° C. is still more preferable. By the boiling point of the other solvent being within the above range, the intermittent properties tend to improve.

It is preferable that the content of the other solvent is 5.0 mass % to 25 mass % with respect to the total amount of the ink composition, and 10 mass % to 20 mass % is more preferable.

Alkyl Polyol with Standard Boiling Point 280° C. or Higher

The ink composition of the embodiment does not substantially include an alkyl polyol with a standard boiling point of 280° C. or higher. When the ink composition substantially includes an alkyl polyol with a standard boiling point of 280° C. or higher, the drying properties of the ink are significantly lowered. As a result, in various recording media, in particular a recording medium that is non-absorbent or with low absorbency to ink, not only are light and dark unevennesses in the image noticeable, but the fixing properties of the ink are also not obtained.

The wording "does not substantially include" indicates a predetermined component is not added exceeding an amount that sufficiently achieves the meaning of adding. It is preferable that the content of the alkyl polyol with a standard boiling point of 280° C. or higher in the ink composition is 0 mass % or more to less than 1.0 mass % with respect to the total mass of the ink composition, 0 mass % or more to less than 0.5 mass % is more preferable, 0 mass % or more to less than 0.1 mass % is still more preferable, 0 mass % or more to less than 0.05 mass % is even more preferable, 0 mass % or more to less than 0.01 mass % is still more preferable, and 0 mass % or more to less than 0.001 mass % is most preferable. By the content being within the above ranges, the abrasion resistance of the recorded material on which the ink composition is used is suppressed from lowering due to the alkyl polyol with a standard boiling point of 280° C. or higher, and it is possible to obtain a recording material with superior abrasion resistance.

Surfactant

It is preferable that the ink composition used in the embodiment includes a surfactant. Although not particularly limited, examples of the surfactant include acetylene glycol-based surfactants, fluorine based surfactants, and silicone based surfactants. By the ink composition including these surfactants, the drying properties of the ink composition attached to the recording medium become more favorable, and high speed printing is possible.

Among these, because it is much more difficult for foreign material to occur in the ink composition as the solubility in the ink composition increases, silicone-based surfactants are more preferable.

Although not particularly limited, it is preferable that the acetylene glycol-based surfactant is at least one type selected from alkylene oxide adducts of 2,4,7,9-tetramethyl-5-decyne-4,7-diol, and 2,4,7,9-tetramethyl-5-decyne-4,7-diol, and 2,4-dimethyl-5-decyne-4-ol and alkylene oxide adducts of 2,4-dimethyl-5-decyne-4-ol. Although not particularly limited, examples of commercially available acetylene glycol-based surfactants include the Olfine 104 series, or Olfine E series, such as Olfine E1010 (manufactured by Air Products Japan, Inc.), and Surfynol 465, Surfynol 61, and Surfynol DF110D (manufactured by Nissin Chemical Industry Co., Ltd.). The acetylene glycol-based surfactant may be used singly, or two or more types may be used together.

Although not particularly limited, examples of the fluorine-based surfactant include perfluoroalkylsulfonates, perfluoroalkyl carboxylates, perfluoroalkylphosphoric acid esters, perfluoroalkylethylene oxide adducts, perfluoroalkylbetaines, and perfluoroalkylamine oxide compounds. Although not particularly limited, examples of commercially available fluorine-based surfactants include S-144 and S-145 (manufactured by Asahi Glass), FC-170C, FC-430, and Fluorad FC4430 (manufactured by Sumitomo 3M Limited), FSO, FSO-100, FSN, FSN-100, and FS-300 (manufactured by Dupont), and FT-250 and 251 (manufactured by Neos Company Limited). These fluorine-based surfactants may be used singly or two or more types may be used in combination.

Examples of the silicone-based surfactant include polysiloxane-based compounds and polyether-modified organosiloxanes. Although not particularly limited, examples of commercially available silicone-based surfactants include BYK-306, BYK-307, BYK-333, BYK-341, BYK-345, BYK-346, BYK-347, BYK-348 and BYK-349 (all product names, manufactured by BYK-Chemie Japan Co., Ltd.), and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all product names, manufactured by Shin-Etsu Chemical Co., Ltd.).

It is preferable that the content of the surfactant is 0.1 mass % to 5 mass % with respect to the total amount of the ink composition, and 0.1 mass % to 3.0 mass % is more preferable. By the content of the surfactant being within this range, the wettability of the ink composition attached to the recording medium tends to further improve.

pH Adjuster

The ink composition of the embodiment may further include a pH adjuster. Examples of the pH adjuster include, for example, inorganic alkalis such as potassium hydroxide and sodium hydroxide, ammonia, diethanolamine, triethanolamine, triisopropanolamine, morpholine, potassium dihydrogen phosphate, disodium hydrogen phosphate, and ethylenediamine tetra acetic acid sodium.

These pH adjusters may be used singly, or two or more may be used in combination. The content of the pH adjuster is not particularly limited, and may be appropriately determined as necessary.

Other Components

It is possible for various additives, such as dissolution aids, viscosity adjusters, antioxidants, preservatives, antifungal agents, anti-foaming agents, and corrosion inhibitors, to be added, as appropriate, to the ink of the embodiment, in addition to the above components.

Heating Method

It is preferable that the ink composition of the embodiment is heated during discharge or after discharge to the recording medium. By being applied to the recording medium in the above-described heated state, bleeding of the image is prevented, and it is possible to form and image with excellent abrasion resistance. By performing recording by the ink composition being attached on a heated recording medium using the ink composition of the embodiment, it is possible to soften the shell polymer when the ink composition is attached to the recording medium, for the core polymer to flow out, and to form a film with excellent abrasion resistance.

In a case where the recording medium is heated when discharging the ink composition, the head is heated by radiation heating thereof. However, according to the ink composition according to the embodiment, it is possible for nozzle clogging to be suppressed even in cases such as the recording head being heated, and it is possible for the discharge stability to be improved. It is preferable that the surface temperature when discharging the ink composition during heating is 30° C. to 60° C., and 40° C. to 60° C. is more preferable. In cases of heating after discharge of the ink composition, heating to a higher temperature than the heating temperature of the recording medium during discharge of the ink composition is preferable. It is preferable that the heating temperature is 60° C. or higher, 70° C. or higher to 120° C. or lower is more preferable, and 70° C. or higher to 110° C. or lower is still more preferable.

A platen heater or infrared radiation is used in heating the recording medium. It is preferable that the ink composition of the embodiment is an ink composition used in ink jet recording methods, in light of more effectively and reliably exhibiting the actions and effects of the invention.

Method of Manufacturing of Ink

It is possible to obtain the ink composition of the embodiment by mixing the above-mentioned components (materials) in an arbitrary order, performing filtration or the like as necessary, and removing impurities. Preparing the pigment in advance to be in a uniformly dispersed state in the solvent then mixing simplifies the handling thereof, and is therefore preferable.

A method in which the materials are sequentially added to a container provided with a stirring apparatus such as a mechanical stirrer or a magnetic stirrer and then mixed by stirring is favorably used as a mixing method for each material. As the filtration method, it is possible for centrifugal filtration, filter filtration, or the like to be performed, as necessary.

Recording Medium

The recording medium is an absorbent recording medium or low absorbency recording medium, or a non-absorbent recording medium. It is preferable that the recording medium is a low absorbency recording medium or a non-absorbent recording medium, and a non-absorbent recording medium is more preferable. It is preferable that a recording medium heated as described above is used.

Although not particularly limited, it is particularly preferable that the absorbent recording medium is a highly absorbent medium such as a fabric. Although not limited to the following, examples of the fabric include natural fibers or synthetic fibers such as silk, cotton, wool, nylon, polyester, and rayon.

Although not particularly limited, examples of the low absorbency recording medium include coated papers provided with a coating layer for receiving an oil based ink composition on the surface thereof. Although not particularly limited, examples of the coated paper include book printing papers, such as art paper, coated papers, and mat papers.

Although not particularly limited, examples of the non-absorbent recording medium include films or plates of plastics such as polyvinyl chloride, polyethylene, polypropylene, and polyethylene terephthalate (PET), plates of metals such as iron, silver, copper and aluminum, or metal plates or plastic films manufactured by deposition of these various metals, or alloy plates such as stainless steel or brass. It is preferable that the non-absorbent recording medium does not have an ink absorbing layer formed from silica particles or alumina particles or an ink absorbing layer formed from a hydrophilic polymer such as polyvinyl alcohol (PVA) or polyvinyl pyrrolidone (PVP) formed thereon.

The terms "low absorbency recording medium" and "non-absorbent recording medium" refer to a recording medium with a water absorption amount from the start of contact up to 30 msec being 10 mL/m$^2$ or less in the Bristow method. The Bristow method is the most widespread method used as a method of measuring a liquid absorption amount in a short time, and is also employed by the Japan Technical Association of the Pulp and Paper Industry (JAPAN TAPPI). The details of the testing method are disclosed in the standard No. 51 "Paper and Cardboard—Liquid Absorbency Test Method—Bristow Method" of the "JAPAN TAPPI Paper Pulp Test Method 2000 Edition".

In addition, non-absorbent or low absorbency recording media may be classified according to wettability with respect to water on the recording surface. For example, it is possible to characterize recording media by adding a 0.5 μL water droplet onto the recording surface of the recording medium and measuring the rate of decrease in the contact angle (comparison of the contact angle 0.5 ms and the contact angle at 5 sec. after landing). More specifically, as the characteristics of the recording medium, the wording non-absorbent in "non-absorbent recording medium" indicates that the above-described lowering rate is less than 1%, and low absorbency in "low absorbency recording medium" indicates that the lowering rate is 1% or higher to less than 5%. "Absorbent" indicates a lowering rate of 5% or more. It is possible for the contact angle to be measured using a portable contact angle meter PCA-1 (manufactured by Kyowa Kaimen Kagaku), or the like.

Ink Jet Recording Method

The recording method of the embodiment is performed using the above-described ink jet recording apparatus. The ink jet recording method includes heating the recording medium P with the IR heater 3 or the platen heater 4, discharging the ink composition from the nozzles of the nozzle forming surface 37 of the recording head 2, and being attached to the recording medium P, and drying the ink jet ink composition attached on the recording medium P by a curing heater 5 or the like. In so doing, the water content or the like included in the ink composition is quickly evaporated and dispersed, and a coating film is formed by the core-shell resin included in the ink composition. In this way, the ink composition is strongly fixed (attached) on the recording medium, and it is possible for a high quality image with excellent abrasion resistance to be obtained in a short time.

EXAMPLES

Below, the examples and the comparative examples of the invention will be more specifically described. The invention is not limited by any of the following examples.

Preparation of Core-Shell Resin Aqueous Dispersion Liquid

A dropping device, a thermometer, a water-cooled reflux condenser, and a stirrer are provided in the reaction container, 100 parts of ion-exchange water were introduced, and 0.2 parts of ammonium persulfate as a polymerization initiator were added while stirring in a nitrogen atmosphere at 70° C., and a monomer solution which 20 parts of styrene, 17 parts of methyl acrylate, 30 parts of methyl methacrylate and 5 parts of acrylic acid being added dropwise to the reaction container and reacted, thereby polymerizing and preparing the shell polymer. Thereafter, after a mixed solution of 0.2 parts of potassium persulfate, 50 parts of styrene, and 22 parts of n-butyl acrylate were added dropwise and subjected to polymerization reaction while being stirred at 70° C., a dispersion liquid including the core shell resin 1 was prepared by adjusting the pH to 8 to 8.5 by neutralizing with potassium hydroxide and filtering with a 0.3 μm filter.

Other than changing the components that configure the shell and core and the proportions thereof as shown in Table 1, the dispersion liquids including the core-shell resins 2 to 7 were prepared with the same method as the core-shell resin 1.

The glass-transition temperature of the shell polymer and the core polymer included in the core-shell resin is calculated using the above-described FOX formula.

The core-shell resin obtained above was measured by a Microtrac UPA (manufactured by Nikkiso, Co, Ltd.), and the average particle diameter φ nm of the core-shell resin was obtained.

The Tg of the core polymer, the Tg of the shell polymer, and the average particle diameter in each of core-shell resin 1 to 7 are all noted in Table 1.

TABLE 1

|  |  | Resin 1 | Resin 2 | Resin 3 | Resin 4 | Resin 5 | Resin 6 | Resin 7 |
|---|---|---|---|---|---|---|---|---|
| Core | styrene (80° C.) | 50 | 20 | 50 | 50 | 20 | 50 | 22 |
|  | benzyl methacrylate (54° C.) | 0 | 30 | 0 | 0 | 0 | 0 | 0 |
|  | benzyl acrylate (6° C.) | 0 | 0 | 0 | 10 | 0 | 0 | 0 |
|  | n-butyl methacrylate (20° C.) | 0 | 0 | 0 | 0 | 0 | 22 | 0 |
|  | n-butyl acrylate (−55° C.) | 22 | 22 | 30 | 33 | 10 | 0 | 50 |
| Shell | styrene (80° C.) | 20 | 30 | 40 | 20 | 30 | 20 | 20 |
|  | benzyl methacrylate (54° C.) | 0 | 0 | 10 | 0 | 10 | 0 | 0 |
|  | methyl acrylate (10° C.) | 17 | 12 | 15 | 0 | 12 | 37 | 30 |
|  | ethyl acrylate (−24° C.) | 0 | 5 | 0 | 0 | 0 | 0 | 17 |
|  | methyl methacrylate (105° C.) | 30 | 20 | 50 | 14 | 0 | 10 | 0 |
|  | ethyl methacrylate (65° C.) | 0 | 0 | 0 | 0 | 10 | 0 | 0 |
|  | acrylic acid (106° C.) | 5 | 5 | 5 | 0 | 8 | 5 | 5 |
| Physical Properties | Particle Diameter (nm) | 35 | 41 | 36 | 47 | 38 | 37 | 45 |
|  | Core Tg (° C.) | 39 | 28 | 29 | 24 | 35 | 62 | −14 |
|  | Shell Tg (° C.) | 76 | 70 | 81 | 111 | 65 | 49 | 28 |

Preparation of Ink Compositions

Each of the materials was mixed so as to have the constitutions (mass %) shown in the following Table 2 and sufficiently stirred, thereby obtaining the ink compositions 1 to 8. In ink composition 8, a styrene-acrylic acid copolymer based resin emulsion (Tg 96° C., minimum film forming temperature 63° C.) was used without using the core-shell resin.

TABLE 2

|  |  | Ink 1 | Ink 2 | Ink 3 | Ink 4 | Ink 5 | Ink 6 | Ink 7 | Ink 8 |
|---|---|---|---|---|---|---|---|---|---|
| Pigment | Carbon Black | 2 | 2 | 2 | 2 | 2 | 2 | 2 | 2 |
| Solvent | 1,3-butane diol | 10 | 10 | 10 | 10 | 10 | 10 | 10 | 10 |
|  | 2-pyrrolidone | 10 | 10 | 10 | 10 | 10 | 10 | 10 | 10 |
| Surfactant | BYK348 | 0.4 | 0.4 | 0.4 | 0.4 | 0.4 | 0.4 | 0.4 | 0.4 |
|  | Surfynol DF110D | 0.3 | 0.3 | 0.3 | 0.3 | 0.3 | 0.3 | 0.3 | 0.3 |
| Core-Shell Resin | Resin 1 | 3 |  |  |  |  |  |  |  |
|  | Resin 2 |  | 3 |  |  |  |  |  |  |
|  | Resin 3 |  |  | 3 |  |  |  |  |  |
|  | Resin 4 |  |  |  | 3 |  |  |  |  |
|  | Resin 5 |  |  |  |  | 3 |  |  |  |
|  | Resin 6 |  |  |  |  |  | 3 |  |  |
|  | Resin 7 |  |  |  |  |  |  | 3 |  |
| Non-Core-Shell Resin | Joncryl 7610 manufactured by BASF Corporation styrene-acrylic resin |  |  |  |  |  |  |  | 3 |

TABLE 2-continued

|  |  | Ink 1 | Ink 2 | Ink 3 | Ink 4 | Ink 5 | Ink 6 | Ink 7 | Ink 8 |
|---|---|---|---|---|---|---|---|---|---|
| Wax | AQUACER593 Polyolefin Wax manufactured by BYK Chemie Japan Co., Ltd. | 1.5 | 1.5 | 1.5 | 1.5 | 1.5 | 1.5 | 1.5 | 1.5 |
| pH Adjuster | Triethanol Amine | 0.5 | 0.5 | 0.5 | 0.5 | 0.5 | 0.5 | 0.5 | 0.5 |
|  | Ethylenediamine Tetra Acetic Acid Sodium | 0.3 | 0.3 | 0.3 | 0.3 | 0.3 | 0.3 | 0.3 | 0.3 |
|  | Water | Remainder | Remainder | Remainder | Remainder | Remainder | Remainder | Remainder | Remainder |

Ink Jet Recording

A modified printer PX-H10000 (manufactured by Seiko Epson corporation) was used (below, referred to as "modified PX-H10000"). The modified portions are the inclusion of a silicon nozzle plate with a water repellent film, an absorption member, and a driving mechanism. A non-woven fabric of cupra (density 0.01 (g/cm$^2$, cloth thickness 0.4 mm) was used as the absorption member. The driving mechanism is a mechanism that performs the cleaning operation that removes the ink composition attached to the nozzle forming surface by the absorption member, by pressing the absorption member at a predetermined load from the side opposite the side that contacts the nozzle forming surface of the recording head 2 via the pressing member to come into contact with the nozzle forming surface, and the absorption member and the recording head being relatively moved. In the cleaning operation, the following maintenance liquid are also used. The maintenance liquid is used by being impregnated in the absorption member in advance.

Adjustment of Maintenance Liquid

Each component shown in Table 3 below was adjusted by removing impurities such as dust and coarse particles by filtering with a membrane filter with a 5 μm pore size after mixing with the constitutions disclosed in Table 3 below and sufficiently stirring.

TABLE 3

| Type of Material | Material Name | Maintenance Liquid |
|---|---|---|
| Organic Solvent | 1,2-hexane diol | 5 |
|  | polyethylene glycol | 80 |
| pH Adjuster | triethanol amine | 0.5 |
| Surfactant | Olfine E1010 | Remainder |
|  | Total | 100 |

Continuous Printing Stability Test

Using the modified PX-H10000, a recording medium (IJ 180 manufactured by 3M Limited) was heated with a platen heater and the inks of the examples and comparative examples were continuously discharged for one hour at a resolution of 720 dpi vertical×720 dpi horizontal, thereby obtaining the recording material. The platen heater is adjusted so that the surface temperature of the recording medium reaches 45° C. The evaluation criteria of the obtained recording media are as follows. The evaluation results are shown in Table 4.

A: Stripes due to nozzle omission or shifting not visually observed

B: Stripes due to nozzle omission or shifting visually confirmed

Liquid Repellent Film Stability Test

Using the modified PX-H10000, a suction operation that suctions ink into the head using a suction pump was performed, and thereafter the cleaning operation was executed. The cycle was repeated 12000 times as one pass. Thereafter, the state of the liquid repellent film in the vicinity of the nozzles was measured with an optical microscope (High-precision non-contact depth measuring device "Hisomet-II" DH2 by Union Optical Co., Ltd.). The evaluation criteria are as follows. The evaluation results are shown in Table 4.

A: level where peeling of the liquid repellent film not observable, or level where observable, but with no influence on discharge B: at level where liquid repellent film at edge of nozzle peeled, and influences discharge Nozzle Wiping Properties Test Using the modified PX-H10000, a suction operation that suctions ink into the head using a suction pump was performed, and thereafter the cleaning operation was executed. The attachment of ink on the surface of the nozzle plate after execution of the cleaning operation visually observed. The evaluation criteria are as follows. The evaluation results are shown in Table 4.

A: almost no ink remaining after wiping observed

B: significant ink remaining after wiping

Cleaning Properties Test

After the nozzle wiping properties test, a nozzle check pattern was printed, and whether the nozzles correctly discharged was visually confirmed. The evaluation criteria are as follows. The evaluation results are shown in Table 4.

A: shifting and bent nozzles not observed, or observable, but shifting or bending is slight B: clear sifting and bent nozzles

TABLE 4

|  | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|
| Ink | Ink 1 | Ink 2 | Ink 3 | Ink 4 | Ink 5 | Ink 1 | Ink 1 | Ink 6 | Ink 7 | Ink 8 |
| Load with Respect to Fabric (gf/cm) | 100 | 100 | 100 | 100 | 100 | 20 | 150 | 100 | 100 | 100 |
| Continuous Printing Stability Test | A | A | A | A | A | A | A | B | B | B |

TABLE 4-continued

|  | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|
| Liquid Repellent Storage Test | A | A | A | A | A | A | A | B | B | B |
| Nozzle Wiping Properties Test | A | A | A | A | A | A | A | B | B | B |
| Cleaning Test | A | A | A | A | A | A | A | B | B | B |

Comparative Examples 1 and 2 are examples using a core-shell resin not corresponding to the core-shell resin stipulated by the invention, and Comparative Example 3 is an example not using the core-shell resin. In Examples 1 to 7, excellent results in any of the liquid repellent film storage properties, nozzle wiping properties test, and cleaning test were obtained compared to Comparative Examples 1 to 3. In Example 6 in which the cleaning operation was performed with the load with respect to the absorption member (fabric) reduced, although in a range not exhibiting problems, the wiping properties of the ink composition were lowered, and the evaluation results of the nozzle wiping properties test were lowered. In Example 7 in which the cleaning operation was performed with the load with respect to the absorption member (fabric) increased, although in a range not exhibiting problems, damage to the liquid repellent film was large compared to Example 1, and the evaluation results of the liquid repellent film storage properties test were reduced.

The entire disclosure of Japanese Patent Application No. 2014-080523, filed Apr. 9, 2014 is expressly incorporated by reference herein.

What is claimed is:

1. An ink jet recording apparatus, comprising:
an ink composition including a pigment and a resin and not substantially including an alkyl polyol with a standard boiling point of 280° or higher;
a recording head including a plurality of nozzles that discharge the ink composition, and a nozzle forming surface having the discharge ports of the plurality of nozzles;
an absorption member that absorbs the ink composition attached to the discharge ports of the nozzles and the nozzle formation surface; and
a driving mechanism that performs a cleaning operation by relatively moving at least one of the absorption member and the recording head, and removing the ink composition attached to the nozzle forming surface with the absorption member,
wherein the resin is a core-shell resin provided with a core polymer and a shell polymer, and a glass-transition temperature of the shell polymer is higher than a glass-transition temperature of the core polymer; and
wherein the shell polymer includes an acrylate monomer and an aromatic monomer as constituent units.

2. An ink jet recording apparatus, comprising:
an ink composition including a pigment and a resin and not substantially including an alkyl polyol with a standard boiling point of 280° or higher;
a recording head including a plurality of nozzles that discharge the ink composition, and a nozzle forming surface having the discharge ports of the plurality of nozzles;
an absorption member that absorbs the ink composition attached to the discharge ports of the nozzles and the nozzle formation surface; and
a driving mechanism that performs a cleaning operation by relatively moving at least one of the absorption member and the recording head, and removing the ink composition attached to the nozzle forming surface with the absorption member,
wherein the resin is a core-shell resin provided with a core polymer and a shell polymer, and a glass-transition temperature of the shell polymer is higher than a glass-transition temperature of the core polymer; and
wherein the driving mechanism relatively presses the absorption member and the nozzle forming surface so that the linear pressure reaches 8 gf/cm to 150 gf/cm.

3. An ink jet recording apparatus, comprising:
an ink composition including a pigment and a resin and not substantially including an alkyl polyol with a standard boiling point of 280° or higher;
a recording head including a plurality of nozzles that discharge the ink composition, and a nozzle forming surface having the discharge ports of the plurality of nozzles;
an absorption member that absorbs the ink composition attached to the discharge ports of the nozzles and the nozzle formation surface; and
a driving mechanism that performs a cleaning operation by relatively moving at least one of the absorption member and the recording head, and removing the ink composition attached to the nozzle forming surface with the absorption member,
wherein the resin is a core-shell resin provided with a core polymer and a shell polymer, and a glass-transition temperature of the shell polymer is higher than a glass-transition temperature of the core polymer; and
wherein a liquid repellent film is formed on the nozzle forming surface.

4. An ink jet recording apparatus, comprising:
an ink composition including a pigment and a resin and not substantially including an alkyl polyol with a standard boiling point of 280° or higher;
a recording head including a plurality of nozzles that discharge the ink composition, and a nozzle forming surface having the discharge ports of the plurality of nozzles;
an absorption member that absorbs the ink composition attached to the discharge ports of the nozzles and the nozzle formation surface;
a driving mechanism that performs a cleaning operation by relatively moving at least one of the absorption member and the recording head, and removing the ink composition attached to the nozzle forming surface with the absorption member; and a maintenance liquid used during the cleaning operation, wherein the resin is a core-shell resin provided with a core polymer and a shell polymer, and a glass-transition temperature of the shell polymer is higher than a glass-transition temperature of the core polymer.

5. An ink jet recording apparatus, comprising:

an ink composition including a pigment and a resin and not substantially including an alkyl polyol with a standard boiling point of 280° or higher;

a recording head including a plurality of nozzles that discharge the ink composition, and a nozzle forming surface having the discharge ports of the plurality of nozzles;

an absorption member that absorbs the ink composition attached to the discharge ports of the nozzles and the nozzle formation surface;

a driving mechanism that performs a cleaning operation by relatively moving at least one of the absorption member and the recording head, and removing the ink composition attached to the nozzle forming surface with the absorption member; and a maintenance liquid used during the cleaning operation, wherein the resin is a core-shell resin provided with a core polymer and a shell polymer, and a glass-transition temperature of the shell polymer is higher than a glass-transition temperature of the core polymer; and wherein a surface tension at 25° C. of the maintenance liquid is 45 mN/m or less.

6. An ink jet recording apparatus, comprising:

an ink composition including a pigment and a resin and not substantially including an alkyl polyol with a standard boiling point of 280° or higher;

a recording head including a plurality of nozzles that discharge the ink composition, and a nozzle forming surface having the discharge ports of the plurality of nozzles;

an absorption member that absorbs the ink composition attached to the discharge ports of the nozzles and the nozzle formation surface; and a driving mechanism that performs a cleaning operation by relatively moving at least one of the absorption member and the recording head, and removing the ink composition attached to the nozzle forming surface with the absorption member, wherein the resin is a core-shell resin provided with a core polymer and a shell polymer, and a glass-transition temperature of the shell polymer is higher than a glass-transition temperature of the core polymer; and wherein the glass transition temperature of the shell polymer is higher than the heating temperature of the recording medium when the ink composition is discharged.

7. The ink jet recording apparatus according to claim 1, wherein the average particle diameter of the core-shell resin is 10 nm to 100 nm.

8. The ink jet recording apparatus according to claim 1, wherein a difference between the glass transition temperatures of the core polymer and the shell polymer is 10° C. or higher.

* * * * *